United States Patent
Oltmann et al.

(10) Patent No.: US 12,491,912 B2
(45) Date of Patent: Dec. 9, 2025

(54) METHOD AND DEVICE FOR OPERATING A VEHICLE IN AN AUTOMATED DRIVING OPERATION

(71) Applicant: MERCEDES-BENZ GROUP AG, Stuttgart (DE)

(72) Inventors: Volker Oltmann, Calw (DE); Nikolai Tochtermann, Leonberg (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 206 days.

(21) Appl. No.: 18/292,386

(22) PCT Filed: Jun. 22, 2022

(86) PCT No.: PCT/EP2022/067017
§ 371 (c)(1),
(2) Date: Jan. 26, 2024

(87) PCT Pub. No.: WO2023/006304
PCT Pub. Date: Feb. 2, 2023

(65) Prior Publication Data
US 2025/0074465 A1    Mar. 6, 2025

(30) Foreign Application Priority Data
Jul. 27, 2021   (DE) .................... 10 2021 003 867.3

(51) Int. Cl.
*B60W 60/00*    (2020.01)
*B60W 50/029*   (2012.01)

(52) U.S. Cl.
CPC ...... *B60W 60/0015* (2020.02); *B60W 50/029* (2013.01); *B60W 2520/10* (2013.01); *B60W 2552/53* (2020.02)

(58) Field of Classification Search
CPC .......... B60W 60/0015; B60W 50/029; B60W 2552/53; B60W 2520/10
See application file for complete search history.

(56) References Cited

U.S. PATENT DOCUMENTS 11,603,115 B1 *   3/2023   Heckmann .......... B60W 10/182
11,608,080 B2 *   3/2023   Oltmann ........... B60W 60/0015
(Continued)

FOREIGN PATENT DOCUMENTS

DE    10034224 A1    2/2002
DE    10118300 A1    11/2002
(Continued)

OTHER PUBLICATIONS mikrocontroller.net; "10bit Signal auf 8 bit runter manipulieren;" Oct. 6, 2015; https://www.mikrocontroller.net/topic/378404.
(Continued)

*Primary Examiner* — Peter D Nolan
*Assistant Examiner* — Wae L Louie
(74) *Attorney, Agent, or Firm* — PATENT PORTFOLIO BUILDERS PLLC

(57) ABSTRACT

A method for operating a vehicle in an automated driving operation involves a main control device determining a driving instruction and providing it to an auxiliary control device. The driving instruction includes information about a course of a path on which the vehicle should be guided into a stopping position, which is determined by a series of path points having a spacing value assigned to each path point. The spacing value corresponds to a spacing of the path point from left or right lane markings. Spacing values are transmitted to the auxiliary control device as digital data having a limited representable value range of the spacing values. The spacing values are reduced by scaling before the transmission to the auxiliary control device, and are calculated (Continued)

Figure 1:
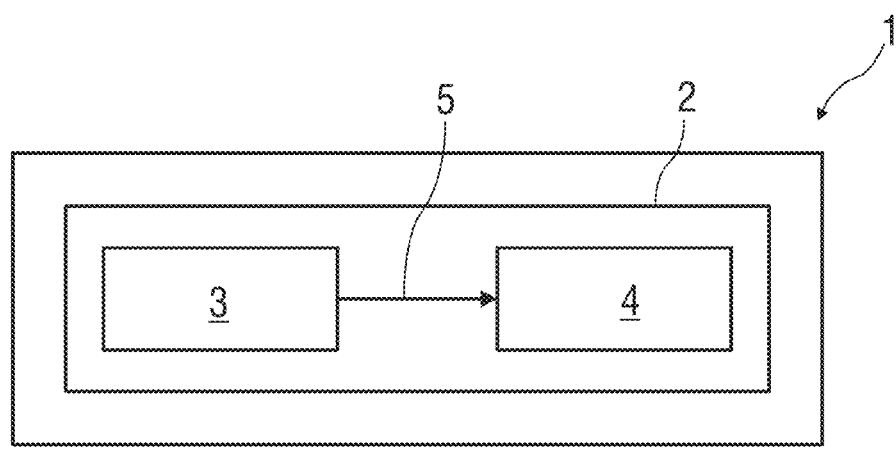

back in the auxiliary control device after the transmission if a lane width is greater than the representable value range of the spacing values.

8 Claims, 4 Drawing Sheets

(56) References Cited

U.S. PATENT DOCUMENTS

| | | | | |
|---|---|---|---|---|
| 11,945,470 | B2* | 4/2024 | Oltmann | B60W 10/184 |
| 12,115,985 | B2* | 10/2024 | Oltmann | B60W 50/029 |
| 2021/0197864 | A1* | 7/2021 | Oltmann | B60W 60/007 |
| 2021/0206388 | A1* | 7/2021 | Smith | B60W 60/0015 |
| 2022/0126880 | A1* | 4/2022 | Kuemmel | B60W 40/105 |
| 2022/0219731 | A1* | 7/2022 | Ran | G08G 1/0112 |
| 2023/0234575 | A1* | 7/2023 | Iwase | B60W 30/09 |
| 2024/0262389 | A1* | 8/2024 | Oltmann | B60W 50/029 |
| 2024/0270244 | A1* | 8/2024 | Oltmann | B60W 60/00186 |
| 2025/0074465 | A1* | 3/2025 | Oltmann | B60W 50/06 |

FOREIGN PATENT DOCUMENTS

| | | |
|---|---|---|
| DE | 102015003124 A1 | 9/2016 |
| DE | 102016006137 A1 | 2/2017 |
| DE | 102017011808 A1 | 6/2019 |
| DE | 102018004303 B3 | 11/2019 |
| DE | 102018215695 A1 | 3/2020 |
| DE | 102019102830 A1 | 8/2020 |
| DE | 102019115330 A1 | 12/2020 |
| DE | 102021000369 A1 | 3/2021 |

OTHER PUBLICATIONS

Choi et al.; "Bit-width Reduction and Customized Register for Low Cost Convolutional Neural Network Accelerator;" 2017 IEEE/ACM International Symposium on Low Power Electronics and Design (ISLPED); Jul. 24-27, 2017; Taipei, TW.

International Search Report and Written Opinion mailed Aug. 26, 2022 in related/corresponding International Application No. PCT/EP2022/067017.

Jin et al.; "AdaBits: Neural Network Quantization with Adaptive Bit-Widths;" Cornell University Online Library; Dec. 20, 2019.

Office Action created May 3, 2022 in related/corresponding DE Application No. 10 2021 003 867.3.

* cited by examiner

METHOD AND DEVICE FOR OPERATING A VEHICLE IN AN AUTOMATED DRIVING OPERATION

BACKGROUND AND SUMMARY OF THE INVENTION

Exemplary embodiments of the invention relate to a method for operating a vehicle in an automated driving operation and to a device for carrying out the method.

From the prior art, a method for regulating the movement of a vehicle in an automated driving mode and a device for carrying out the method as described in DE 10 2017 011 808 A1 are known. The automated driving operation can be switched from a regular operating mode, in which the vehicle is guided to a predetermined target position in an automated manner, to an emergency operating mode in which the vehicle is guided to an emergency stopping position in an automated manner. The regulation is carried out by means of a main control device in the regular operating mode and by means of an auxiliary control device in the emergency operating mode. The automated driving operation is switched from the regular operating mode to the emergency operating mode if it is determined that the functionality of the main control device is impaired in the regular operating mode. The regulation is carried out in the regular operating mode based on a regular intended trajectory leading to a target position, which is continuously determined by the main control device in the regular operating mode. The regulation is carried out in the emergency operating mode based on an intended emergency operation trajectory stored in the auxiliary control device and leading to the emergency stopping position, the intended emergency operation trajectory having been determined by the main control device in the regular operating mode before the operating mode was switched into the emergency operating mode and having been fed to the auxiliary control device for storage. In the regular operating mode, in addition to the intended emergency operation trajectory, a lane course associated with the intended emergency operation trajectory of a lane being driven in by the vehicle is determined and fed to the auxiliary control device for storage. The intended emergency operation trajectory and the associated lane course are determined in a vehicle-fixed coordinate system of the main control device. In the emergency operation mode, the lane course of the lane being driven in by the vehicle is determined in a vehicle-fixed coordinate system of the auxiliary control device. In the emergency operation mode, a deviation between the coordinate system of the main control device and of the auxiliary control device is compensated for on the basis of the lane course of the lane stored in the auxiliary control device and the lane course of the lane determined by the auxiliary control device.

A method and a device for operating a vehicle in an automated driving operation are described in DE 10 2015 003 124 A1. During normal functioning of the automated driving operation, an intended emergency operation trajectory is continuously determined and stored, which, after at least one predetermined error arises, should be used as the basis of an automated trajectory regulation of the vehicle. If it is detected that the at least one predetermined error has arisen, an emergency operating mode is activated, in which the automated trajectory regulation of the vehicle is initiated and is carried out for a predetermined period of time and/or until the vehicle comes to a standstill according to the intended emergency operation trajectory stored before the at least one predetermined error arises, if and as long as no vehicle guidance takeover is implemented by a driver of the vehicle.

Exemplary embodiments of the invention are directed to a method for operating a vehicle in an automated driving operation that is improved in relation to the prior art and a device for carrying out the method that is improved in relation to the prior art.

In a method for operating a vehicle in an automated driving operation, in particular in a highly automated or autonomous driving operation, an intended trajectory is regularly, in particular continuously, determined in a regular operating mode by means of a main control device, along which intended trajectory the vehicle is guided to a predetermined target position in an automated manner, in particular by means of the main control device. This target position is, in particular, a target position desired by at least one person, in particular by a user of the vehicle. It is, for example, correspondingly predetermined by this person or in another manner.

In addition, in this regular operating mode, in particular in parallel with the determination of the intended trajectory, a driving instruction for an emergency mode is regularly, in particular continuously, determined by means of the main control device, which driving instruction is transmitted to an auxiliary control device and stored there. This driving instruction is also described as a recurrence path. In the event of an outage of the main control device, the vehicle is guided into a stopping position, in particular a safe stopping position, in an automated manner according to the driving instruction by means of the auxiliary control device in the emergency mode. The stopping position is thus, in particular, an emergency stopping position. The driving instruction is thus determined such that this, i.e., the guidance of the vehicle in the emergency operation mode into the, in particular safe, stopping position is achieved.

According to the invention, the driving instruction comprises information about a course of a path on which the vehicle should be guided into the, in particular safe, stopping position, about a course of a speed with which the vehicle should be guided on the path, and about a location of at least one lane marking or several lane markings relative to the path. The course of the path is determined by a series of path points. At least one spacing value or exactly one spacing value is assigned to each path point, the spacing value corresponding to a spacing of the respective path point from the left or right lane marking. In particular, the location of the at least one lane marking or the several lane markings relative to the path result from the latter. For example, it can also be provided that two spacing values are assigned to each path point, wherein one spacing value corresponds to the spacing of the respective path point from the left lane marking, and the other spacing value corresponds to the spacing of the respective path point from the right lane marking. The spacing values are provided as digital data having a limited bit width for transmission to the auxiliary control device. A maximum bit width for the digital data of the spacing values that cannot be exceeded is thus predetermined. A representable value region of the spacing values is thus limited. It is thus provided that if a lane width is greater than the representable value range of the spacing values, the spacing values are reduced by scaling before the transmission to the auxiliary control device, in particular reduced to the value range that can be represented by means of the limited bit width, and are calculated back in the auxiliary control device after the transmission. The spacing values are scaled, in particular, in the main control device.

The lane width relates, in particular, to a lane that the vehicle should use, i.e., in which the path runs. The lane width is, in particular, predetermined by the left and right lane marking, i.e., by a marking spacing between the left and right lane marking, in particular between the inner edge of the respective lane marking.

A device according to the invention is designed and equipped to carry out this method. It comprises the main control device and the auxiliary control device. The main control device is equipped to regularly determine the intended trajectory in the regular operating mode and to guide the vehicle along the determined intended trajectory to the predetermined target position in an automated manner. The main control device is additionally equipped to regularly determine the driving instruction for the emergency operation mode and to transmit it to the auxiliary control device, wherein the driving instruction comprises information about the course of the path on which the vehicle should be guided into the, in particular safe, stopping position, about the course of the speed with which the vehicle should be guided on the path, and about the location of at least one lane marking relative to the path, wherein the course of the path is determined by a series of path points, wherein at least one spacing value is assigned to each path point, the spacing value corresponding to the spacing of the respective path point from the left or right lane marking. The main control device is further equipped to provide the spacing values as digital data with the limited bit width for transmission to the auxiliary control device, whereby the representable value range of the spacing values is limited. The main control device is further equipped to reduce the spacing values via scaling before the transmission to the auxiliary control device if the lane width is greater than the representable value range of the spacing values. The auxiliary control device is equipped to receive and to store the driving instruction, to guide the vehicle in the event of an outage of the main control device in an automated manner into the, in particular safe, stopping position according to the driving instruction in the emergency mode, and to calculate the received spacing values back if they have been reduced by the scaling before the transmission to the auxiliary control device.

Via the solution according to the invention, the driving instruction is provided for the auxiliary control device via data technology such that the, in particular, quick, correct, and complete transmission of the driving instruction to the auxiliary control device is made possible at as low a bandwidth as possible, and/or a data transmission connection between the main control device and the auxiliary control device is ensured at any time even at a predetermined low bandwidth. The bandwidth, in particular the data rate of the data transmission connection is, for example, limited to a maximum value. The spacing values are thus provided as digital data with limited bit width for transmission to the auxiliary control device, in order to ensure the quick, correct, and complete transmission of the driving instruction from the main control device to the auxiliary control device. From this results the problem that spacing values exceeding the value range that can be represented by means of this limited bit width cannot be transmitted. By means of the solution according to the invention, it is ensured that even in the case of such spacing values exceeding the value range that can be represented by means of this limited bit width, the driving instruction is transmitted quickly, correctly, and completely by scaling the spacing values before the transmission to the auxiliary control device, and thus reducing them to the value range that can be represented by means of the limited bit width, such that the transmission to the auxiliary control device is enabled, and by calculating them back in the auxiliary control device after the transmission, whereby the driving instruction is correctly and completely present in the auxiliary control device. Via the solution according to the invention, it is, in particular, also ensured that the automated guidance of the vehicle both in the regular operating mode and in the emergency mode is not limited to lanes having a predetermined maximum lane width, and is instead possible in lanes having any lane width, as long as they are sufficiently wide to be driven in by the vehicle.

In a possible embodiment of the method, a scaling factor is determined such that the lane width is represented in the representable value range of the spacing values. In a possible embodiment of the device, the main control device is equipped to determine a scaling factor such that the lane width is represented in the representable value range of the spacing values. The quick, correct, and complete transmission of the driving instruction from the main control device to the auxiliary control device is thus ensured.

In a possible embodiment of the method, the scaling factor is also transmitted to the auxiliary control device as an attribute of the driving instruction. In a possible embodiment of the device, the main control device is equipped to transmit the scaling factor to the auxiliary control device as an attribute of the driving instruction, and the auxiliary control device is equipped to receive the scaling factor as an attribute of the driving instruction. The correct back calculation of the spacing values reduced by scaling, in particular in the main control device, and then transmitted to the auxiliary control device is thus ensured in the auxiliary control device, because it is thus ensured that the same scaling factor is used for scaling in the main control device and for calculating back in the auxiliary control device.

In a possible embodiment of the method, coordinates of the path points relative to one another are defined in a vehicle-fixed coordinate system. In a possible embodiment of the method, the main control device is equipped to define coordinates of the path points relative to each other in a vehicle-fixed coordinate system. A correct guidance of the vehicle in the emergency operating mode into the, in particular safe, stopping position in an automated manner according to the driving instruction by means of the auxiliary control device is thus ensured, in particular if the auxiliary control device also uses the vehicle-fixed coordinate system.

In a possible embodiment of the method, a speed value is assigned to each path point, which specifies the desired speed at the respective path point, i.e., the speed which the vehicle should have at the respective path point. In a possible embodiment of the device, the main control device is equipped to assign a speed value to each path point, which specifies the speed which the vehicle should have at the respective path point. A vehicle is thus able to be decelerated in a safe manner, in particular up to a standstill in the, in particular safe, stopping position.

The device is in particular a component of the vehicle. For example, it further comprises an environment recording sensor system, in particular having a lane recording sensor system and/or a lane marking recording sensor system, a position determining unit, in particular for determining a respective current position of the vehicle by means of at least one global navigation satellite system, a digital land map, an inertial sensor system, a drive actuator system, a brake actuator system and/or a steering actuator system of the vehicle. For example, the environment recording sensor system comprises at least one camera, in particular a stereo camera, at least one lidar sensor, at least one radar sensor, and/or at least one ultrasound sensor as environment recording sensors. Several environment recording sensors of the respective sensor type can also be provided. The main control device and/or the auxiliary control device are respectively coupled with at least one, several, or all components of the device. It can be provided with regards to the coupling of the respective components that the main control device is either directly or indirectly coupled with the respective component, in particular via the auxiliary control device, and/or that the auxiliary control device is either directly or indirectly coupled with the respective component, in particular via the main control device.

In the regular operating mode, the vehicle is guided in an automated manner along the intended trajectory to the predetermined target position by means of the main control device, in particular via a control and/or regulation of the drive actuator system, brake actuator system and/or steering actuator system of the vehicle. In the emergency operating mode, the vehicle is guided in an automated manner according to the driving instruction into the, in particular safe, stopping position by means of the auxiliary control device, in particular via a control and/or regulation of the drive actuator system, brake actuator system and/or steering actuator system of the vehicle.

Exemplary embodiments of the invention are explained in more detail in the following with reference to drawings.

BRIEF DESCRIPTION OF THE DRAWING FIGURES

Figure 2:
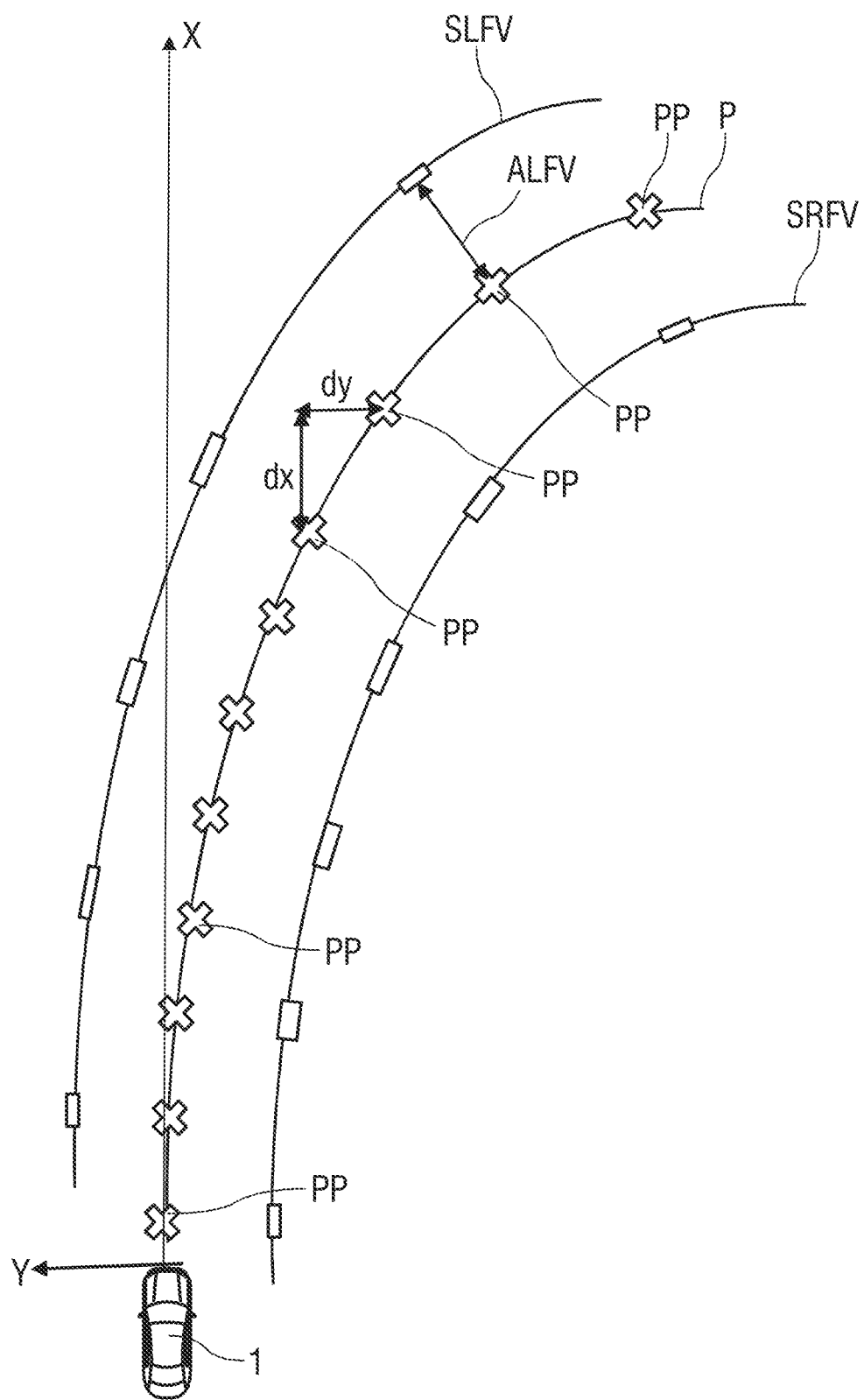
Figure 3:
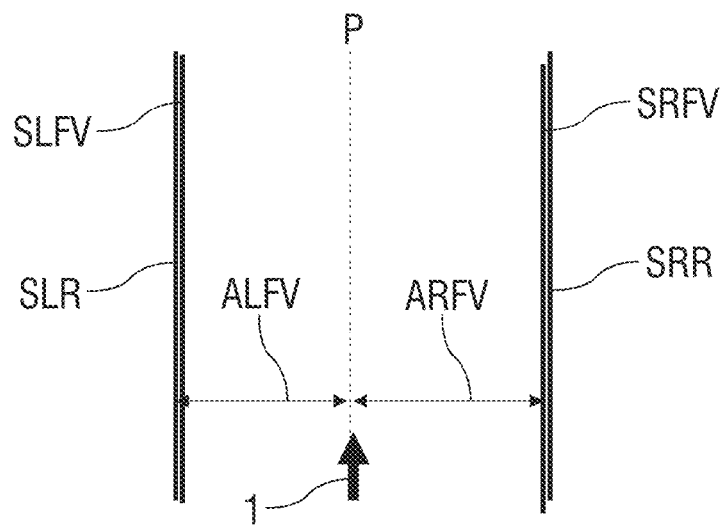
Figure 4:
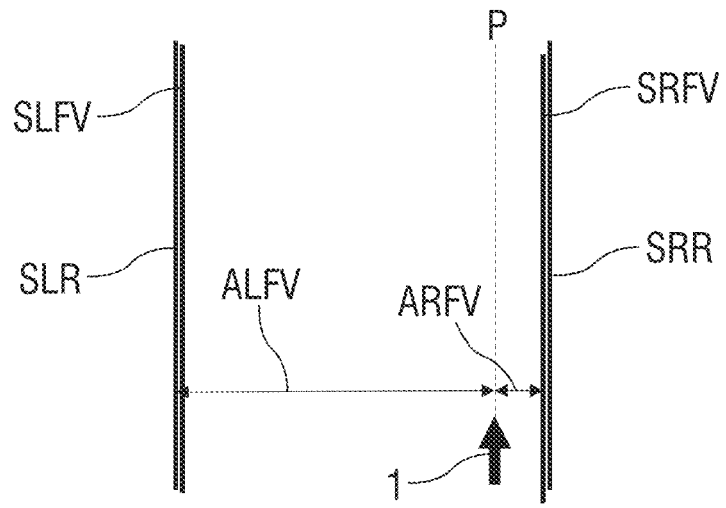
Figure 5:
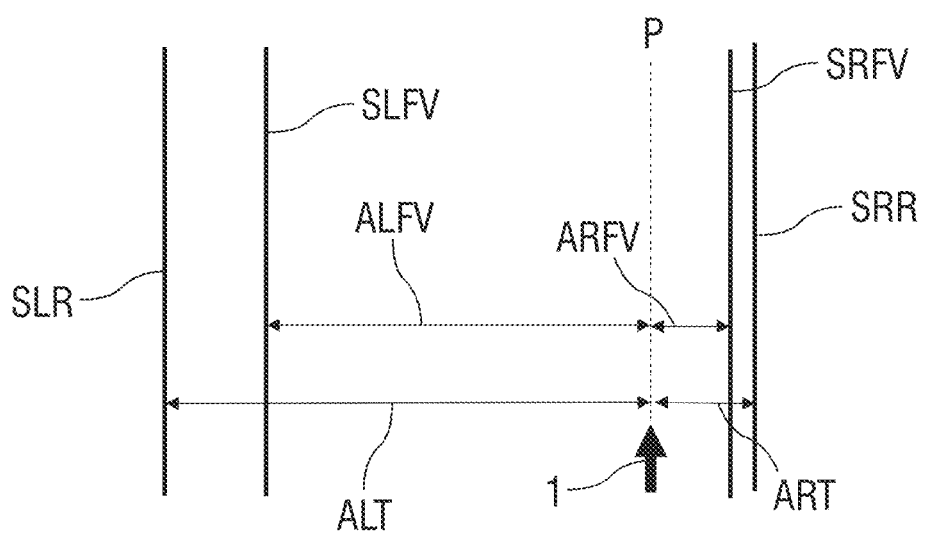

Here:

FIG. 1 schematically shows a vehicle having a device for carrying out a method for operating the vehicle in an automated driving operation, FIG. 2 schematically shows a driving instruction of the method, FIG. 3 schematically shows an example of a driving instruction and lane markings recorded by means of an environment recording sensor system, FIG. 4 schematically shows a further example of a driving instruction and lane markings recorded by means of an environment recording sensor system, and FIG. 5 schematically shows a further example of a driving instruction and lane markings recorded by means of an environment recording sensor system.

Parts corresponding to one another are provided with the same reference numerals in all figures.

DETAILED DESCRIPTION

In the following, a method for operating a vehicle 1 in an automated driving operation and a device 2 for carrying out the method are represented with reference to FIGS. 1 to 5. The device 2 is depicted in a schematically significantly simplified manner as a component of the vehicle 1 in FIG. 1.

In particular, the device 2 comprises a main control device 3 and an auxiliary control device 4, wherein a data transmission connection 5 is provided between the main control device 3 and the auxiliary control device 4, in particular for transmitting a driving instruction described in more detail in the following from the main control device 3 to the auxiliary control device 4.

The device 2 can additionally comprise further components (not depicted in more detail here), for example an environment recording sensor system, in particular having a lane recording sensor system and/or a lane marking recording sensor system, a position determining unit, in particular for determining a respective current position of the vehicle 1 by means of at least one global navigation satellite system, a digital map, an inertial sensor system, a drive actuator system, a brake actuator system, and/or a steering actuator system of the vehicle 1. For example, the environment recording sensor system comprises at least one camera, in particular a stereo camera, at least one lidar sensor, at least one radar sensor, and/or at least one ultrasound sensor as environment recording sensors. Several environment sensors of the respective sensor type can also be provided. The respective environment recording sensor of the environment recording sensor system can also be a component of the lane recording sensor system and/or lane marking recording sensor system. For the lane recording sensor system and/or lane marking recording sensor system, the sensor types camera and lidar sensor, in particular, come into consideration.

The main control device 3 and/or the auxiliary control device 4 are, for example, respectively coupled with at least one, several or all components of the device 2. It can be provided with regards to the coupling of the respective components that the main control device 3 is either directly or indirectly coupled with the respective component, in particular via the auxiliary control device 4, and/or that the auxiliary control device 4 is either directly or indirectly coupled with the respective component, in particular via the main control device 3.

In the method for operating the vehicle 1 in the automated driving operation, in particular in a highly automated or autonomous driving operation, an intended trajectory is regularly, in particular continuously, determined in a regular operating mode by means of the main control device 3, along which intended trajectory the vehicle 1 is guided to a predetermined target position in an automated manner, in particular by means of the main control device 3. This target position is, in particular, a target position desired by at least one person, in particular by a user of the vehicle 1. It is, for example, correspondingly predetermined by this person or in another manner. In this regular operating mode, the vehicle 1 is guided in an automated manner along the intended trajectory to the predetermined target position by means of the main control device 3, in particular via a control and/or regulation of the drive actuator system, brake actuator system and/or steering actuator system of the vehicle 1.

In addition, in this regular operating mode, in particular in parallel with the determination of the intended trajectory, a driving instruction for an emergency mode is regularly, in particular continuously, for example at an interval of 40 ms, determined by means of the main control device 3, which driving instruction is transmitted to the auxiliary control device 4 and stored there. This driving instruction is also described as a recurrence path. In the event of an outage of the main control device 3, the vehicle 1 is guided into a stopping position, in particular a safe stopping position, according to the driving instruction by means of the auxiliary control device 4 in the emergency mode. The stopping position is thus, in particular, an emergency stopping position. The driving instruction is thus determined such that this, i.e., the guidance of the vehicle 1 in the emergency operation mode into the, in particular safe, stopping position is achieved. In the emergency operating mode, the vehicle 1 is guided in an automated manner according to the driving instruction into the, in particular safe, stopping position by means of the auxiliary control device 4, in particular via a control and/or regulation of the drive actuator system, brake actuator system and/or steering actuator system of the vehicle 1.

The driving instruction comprises information about a course of a path P, on which the vehicle 1 should be guided into the, in particular safe, stopping position, about a course of a speed with which the vehicle 1 should be guided on the path P, and about a location of at least one lane marking SLFV, SRFV or several lane markings SLFV, SRFV relative to the path P. As shown in an exemplary form in FIG. 2, the course of the path P is determined by a series of path points PP. A spacing value is assigned to each path point PP, the spacing value corresponding to a spacing ALFV, ARFV of the respective path point PP from the left or right lane marking SLFV, SRFV. The location of the at least one lane marking SLFV, SRFV or the several lane markings SLFV, SRFV relative to the path P result from the latter.

For example, coordinates dx, dy of the path points PP relative to each other are defined in a vehicle-fixed coordinate system. The vehicle-fixed coordinate system is depicted in FIG. 2 with the x-axis X and the y-axis Y.

For example, it is additionally provided that a speed value is assigned to each path point PP, the speed value specifying the desired speed at the respective path point PP, i.e., the speed which the vehicle 1 should have at the respective path point PP. These speed values define the course of the speed, and are thus also a component of the driving instruction. In FIG. 2, the speed value that is assigned to the last path point PP starting from the vehicle 1 is, for example, 0 m/s, i.e., the standstill of the vehicle 1 should be reached here. The speed value 10 m/s is for example assigned to one of the path points PP located in between.

The spacing values are provided as digital data, but with a limited bit width, for transmission to the auxiliary control device 4. A representable value range of the spacing values is thus limited. For example, this value range is limited to four meters. FIGS. 3 and 4 show two examples in which this limited value range is sufficient. The path P of the driving instruction, the vehicle 1, which is schematically depicted as an arrow, lane markings SLFV, SRFV according to the driving instruction, and real lane markings SLR, SRR recorded by means of the environment recording sensor system, in particular lane recording sensor system and/or lane marking recording sensor system, for example by means of a camera, are respectively depicted here. As depicted, the lane markings SLFV, SRFV according to the driving instruction and the real lane markings SLR, SRR recorded by means of the environment recording sensor system overlap or are, to be more specific, positioned on an inner edge of the real lane markings SLR, SRR.

If, however, a lane width of the lane, which is, for example, determined from the digital map and/or by means of the environment recording sensor system, becomes so large that the spacing values for the spacing ALFV, ARFV of the driving instruction from the respective lane marking SLFV, SRFV according to the driving instruction exceed or could exceed the representable value range, a correct transmission of the spacing ALFV, ARFV of the driving instruction would no longer be possible. In the method described here, it is thus provided that if the lane width is greater than a representable value range of the spacing values, the spacing values are reduced by scaling before the transmission to the auxiliary control device 4, in particular reduced to the value range that can be represented by means of the limited bit width, and are calculated back in the auxiliary control device 4 after the transmission. The spacing values are scaled, in particular, in the main control device 3. The lane width relates in particular to the lane which the vehicle 1 should use, i.e., in which the path P runs. The lane width is in particular predetermined by the left and right real lane marking SLR, SRR, i.e., by a marking spacing between the left and right lane marking SLR, SRR FIG. 5 shows the latter in an example. For example, the lane width between the left and right real lane marking SLR, SRR is, for example, five meters. As mentioned above, the representable value range of the spacing values is, for example, limited to four meters. The scaling is thus undertaken. It is in particular provided that a scaling factor is determined such that the lane width is represented in the representable value range of the spacing values.

The scaling factor is thus, for example, calculated as a quotient with the maximum value of the representable value region, in the example four meters in the numerator, and the lane width, in the example five meters in the denominator. The scaling factor is thus 4/5 in this example, and thus 0.8.

With this scaling factor, a respective actual spacing ALT, ART from the respective real lane marking SLR, SRR is thus re-calculated in the respective reduced spacing ALFV, ARFV of the driving instruction. In the depicted example, the actual left spacing ALT of the path P from the real left lane marking SLR is 4.5 m, and the actual right spacing ART of the path P from the real right lane marking SRR is 0.5 m. Via the re-calculation by means of the scaling factor 0.8, i.e., by multiplying the respective actual spacing ALT, ART with this scaling factor, a value of 3.6 m results for the reduced left spacing ALFV of the path P from the left lane marking SLFV according to the driving instruction, and a value of 0.4 m results for the reduced right spacing ARFV of the path P from the right lane marking SRFV according to a driving instruction. The respective lane marking SLFV, SRFV is thus spaced apart from the respective real lane marking SLR, SRR according to the driving instruction, as depicted in FIG. 5.

These determined reduced spacing values are transmitted from the main control device 3 to the auxiliary control device 4, and there calculated back again. For this purpose, it is, in particular, also provided that the scaling factor is transmitted to the auxiliary control device 4 as an attribute of the driving instruction. By calculating the spacing values back in the auxiliary control device 4, it is ensured that the lane markings SLFV, SRFV according to the driving instruction now correspond to the respective real lane marking SLR, SRR again, i.e., overlap the latter or, as shown in FIGS. 3 and 4, are positioned on the inner edge of the respective real lane marking SLR, SRR, such that an exact and safe guidance of the vehicle 1 by means of the driving instruction is ensured.

Via the solution described, the driving instruction is provided for the auxiliary control device 4 via data technology such that the, in particular, quick, correct, and complete transmission of the driving instruction to the auxiliary control device 4 is made possible at as low a bandwidth as possible, and/or the data transmission connection 5 between the main control device 3 and the auxiliary control device 4 is ensured at any time even at a predetermined low bandwidth. The bandwidth, in particular the data rate, of the data transmission connection 5 is, for example, limited to a maximum value. The spacing values are thus provided as digital data with limited bit width for transmission to the auxiliary control device 4, in order to ensure the quick, correct, and complete transmission of the driving instruction from the main control device 3 to the auxiliary control device 4. From this results the problem that spacing values exceeding the value range that can be represented by means of this limited bit width cannot be transmitted. By means of the solution described, it is ensured that even in the case of such spacing values, which exceed the value range which can be represented by means of this limited bit width, the driving instruction is transmitted quickly, correctly, and completely by scaling the spacing values before the transmission to the auxiliary control device 4, and thus reducing them to the value range that can be represented by means of the limited bit width, such that the transmission to the auxiliary control device 4 is enabled, and by calculating them back in the auxiliary control device 4 after the transmission, whereby the driving instruction is correctly and completely present in the auxiliary control device 4. Via the solution described, it is, in particular, also ensured that the automated guidance of the vehicle 1 both in the regular operating mode and in the emergency mode is not limited to lanes having a predetermined maximum lane width, and is instead possible in lanes having any lane width, as long as they are sufficiently wide to be driven in by the vehicle 1.

For example, the driving instruction 64 comprises data sets for 64 path points PP with the respective information described above, in particular in relation to the respective path point PP. Due to less data, in particular a lower bit width, with regard to the spacing value of the respective path point PP, and thus of the respective data set, a quantity of data to be transmitted via the data transmission connection 5, and thus a bandwidth required for the latter, can be significantly reduced.

The method, in particular the automated guidance of the vehicle 1, can also be carried out if only one real lane marking SLR, SRR is recorded by means of the environment recording sensor system, and/or only the driving instruction has only one lane marking SLFV, SRFV, at least if the lane width is constant.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating a vehicle in an automated driving operation, the method comprising:
    regularly determining, by a main control device of the vehicle, an intended trajectory in a regular operating mode along which intended trajectory the vehicle is guided to a predetermined target position in an automated manner; and
    regularly determining a driving instruction for an emergency mode, wherein the regularly determined driving instruction is transmitted to an auxiliary control device of the vehicle and stored in the auxiliary control device, wherein in event of an outage of the main control device, the vehicle is guided, by the auxiliary control device in the emergency mode, into a stopping position in an automated manner according to the driving instruction,
    wherein the driving instruction comprises information about a course of a path on which the vehicle should be guided into the stopping position, about a course of a speed with which the vehicle should be guided on the path, and about a location of at least one lane marking relative to the path,
    wherein the course of the path is determined by a series of path points,
    wherein at least one spacing value is assigned to each path point of the series of path points, wherein the at least one spacing value corresponds to a spacing of the respective path point from left or right lane markings,
    wherein the spacing values assigned to each path point are provided for transmission to the auxiliary control device as digital data having a limited bit width so that a representable value range of the spacing values is limited,
    wherein the spacing values assigned to each path point are reduced by scaling before the transmission to the auxiliary control device, and the spacing values assigned to each path point are calculated back in the auxiliary control device after the transmission if a lane width is greater than the representable value range of the spacing values, and
    wherein a scaling factor is determined such that the lane width is represented in the representable value range of the spacing values.

2. The method of claim 1, wherein the scaling factor is transmitted to the auxiliary control device as an attribute of the driving instruction.

3. The method of claim 1, wherein coordinates of the path points relative to one another are defined in a vehicle-fixed coordinate system.

4. The method of claim 1, wherein a speed value is assigned to each path point, wherein the assigned speed value specifies a speed which the vehicle should have at the respective path point.

5. A device for carrying out a method according to claim 1, the device comprising:
    a main control device; and
    an auxiliary control device,
    wherein the main control device is configured to
        regularly determine an intended trajectory in a regular operating mode, and to guide the vehicle in an automated manner along the determined intended trajectory to a predetermined target position,
        regularly determine a driving instruction for an emergency mode, and to transmit the driving instruction to the auxiliary control device, wherein the driving instruction comprises information about a course of a path on which the vehicle should be guided into a stopping position, about a course of a speed with which the vehicle should be guided on the path, and about a location of at least one lane marking relative to the path, wherein the course of the path is determined by a series of path points, wherein at least one spacing value is assigned to each path point of the series of path points, wherein the at least one spacing value corresponds to a spacing of the respective path point from a left or right lane marking, provide the spacing values assigned to each path point for transmission to the auxiliary control device as digital data having a limited bit width so that a representable value range of the spacing values is limited, reduce the spacing values assigned to each path point before the transmission to the auxiliary control device via scaling, if a lane width is greater than the representable value range of the spacing values, wherein the auxiliary control device is configured to receive and to store the driving instruction, guide the vehicle, in the event of an outage of the main control device, into the stopping position in an automated manner according to the driving instruction in the emergency mode, calculate the received spacing values back if they have been reduced by scaling before transmission to the auxiliary control device, wherein the main control device is further configured to determine a scaling factor such that the lane width is represented in the representable value range of the spacing values.

6. The device of claim 5, wherein the main control device is configured to transmit the scaling factor to the auxiliary control device as an attribute of the driving instruction, and the auxiliary control device is configured to receive the scaling factor as an attribute of the driving instruction.

7. The device of claim 5, wherein the main control device is configured to define coordinates of the path points of the series of path points relative to one another in a vehicle-fixed coordinate system.

8. The device of claim 5, wherein the main control device is configured to assign a speed value to each path point of the series of path points, wherein the assigned speed value specifies a speed which the vehicle should have at the respective path point.

* * * * *